(12) United States Patent
Park

(10) Patent No.: US 8,296,031 B2
(45) Date of Patent: Oct. 23, 2012

(54) ELECTRONIC HYDRAULIC PRESSURE CONTROL SYSTEM AND CONTROL METHOD THEREOF

(75) Inventor: Man Bok Park, Gangnam-gu (KR)

(73) Assignee: Mando Corporation, Gyeonggi-do (KR)

( * ) Notice: Subject to any disclaimer, the term of this patent is extended or adjusted under 35 U.S.C. 154(b) by 865 days.

(21) Appl. No.: 12/259,980

(22) Filed: Oct. 28, 2008

(65) Prior Publication Data

US 2009/0112434 A1    Apr. 30, 2009

(30) Foreign Application Priority Data

Oct. 29, 2007  (KR) .......................... 10-2007-108845

(51) Int. Cl.
*G06G 7/00* (2006.01)
(52) U.S. Cl. ................. 701/71; 701/70; 701/78
(58) Field of Classification Search ............ 701/70, 701/71, 78
See application file for complete search history.

(56) References Cited

U.S. PATENT DOCUMENTS

| | | | | |
|---|---|---|---|---|
| 5,941,608 A * | 8/1999 | Campau et al. | ............ | 303/113.4 |
| 6,175,790 B1 * | 1/2001 | Lin et al. | ............ | 701/36 |
| 6,490,518 B1 * | 12/2002 | Walenty et al. | ............ | 701/71 |
| 6,805,415 B2 * | 10/2004 | Isono et al. | ............ | 303/122.11 |
| 7,350,882 B2 * | 4/2008 | Kamiya et al. | ............ | 303/157 |
| 7,627,412 B2 * | 12/2009 | Motosugi et al. | ............ | 701/71 |
| 2004/0019417 A1 * | 1/2004 | Yasui et al. | ............ | 701/36 |
| 2005/0246086 A1 * | 11/2005 | Motosugi et al. | ............ | 701/78 |
| 2006/0197373 A1 | 9/2006 | Kanagawa et al. | ............ | 303/11 |
| 2006/0238020 A1 * | 10/2006 | Nitta et al. | ............ | 303/113.1 |
| 2007/0260383 A1 * | 11/2007 | Sundaram et al. | ............ | 701/70 |
| 2008/0036294 A1 * | 2/2008 | Yamamoto et al. | ............ | 303/116.1 |
| 2008/0255744 A1 * | 10/2008 | Yasui et al. | ............ | 701/70 |
| 2009/0096279 A1 * | 4/2009 | Hosaka et al. | ............ | 303/11 |
| 2009/0112432 A1 * | 4/2009 | Ueoka et al. | ............ | 701/70 |

FOREIGN PATENT DOCUMENTS

DE    2006/103439 A2    10/2006

\* cited by examiner

*Primary Examiner* — Lesley D Morris
*Assistant Examiner* — Michael Stabley
(74) *Attorney, Agent, or Firm* — McDermott Will & Emery LLP

(57) ABSTRACT

Disclosed are an electronic hydraulic pressure control system and a control method thereof, capable of detecting an error in differential pressure between a master cylinder and a wheel cylinder. The control method includes the steps of acquiring pressure of a master cylinder and pedal pressure according to a stroke distance of a pedal, detecting a time point at which the pressure of the master cylinder and the pedal pressure reach predetermined reference pressure, and determining that an error occurs if the time point exceeds a predetermined reference time point.

8 Claims, 6 Drawing Sheets

ELECTRONIC HYDRAULIC PRESSURE CONTROL SYSTEM AND CONTROL METHOD THEREOF

This application claims the benefit of Korean Patent Application No. 10-2007-0108845 filed on Oct. 29, 2007, in the Korean Intellectual Property Office, the disclosure of which is incorporated herein by reference.

BACKGROUND OF THE INVENTION

1. Field of the Invention

The present invention relates to an electronic hydraulic pressure control system. More particularly, the present invention relates to an electronic hydraulic pressure control system and a control method thereof, which can detect an error in differential pressure between a master cylinder and a wheel cylinder.

2. Description of the Related Art

In general, a hydraulic brake system of a vehicle is equipped with an ABS (Anti-lock Brake System), an ESP (Electronic Stability Program), and TCS (Traction Control System) for preventing wheels from slipping upon a braking operation, thereby improving performance of a brake device of the vehicle.

The ABS, ESP and TCS adjust pressure of a wheel cylinder according to pressure of a master cylinder, the state of road, a vehicle speed, and the like to control a slip of the vehicle and a vehicle posture.

The hydraulic brake system of the vehicle includes a master cylinder connected to a brake pedal and equipped with a pressure sensor, a wheel cylinder connected to front and rear wheels and equipped with a pressure sensor, and a plurality of solenoid valves for controlling hydraulic pressure supplied to the wheel cylinder. If the ABS, ESP and the TCS are not operated, the solenoid valves are not operated, so that differential pressure between the master cylinder and the wheel cylinder is constantly maintained. However, if the ABS, ESP and the TCS are operated, pressure of the master cylinder and the wheel cylinder may vary. Thus, it is necessary to control pressure of the master cylinder and the wheel cylinder such that differential pressure between the master cylinder and the wheel cylinder can be constantly maintained.

According to a conventional electronic hydraulic pressure control system, if the pressure control is not normally performed due to variation in peripheral environment and long-time use of the system, hydraulic liquid may be leaked from the master cylinder to the wheels and the hydraulic liquid is dumped when controlling pressure of the wheels. If the above situation is continued, the hydraulic liquid contained in the master cylinder may be continuously exhausted, so that the hydraulic solution contained in the master cylinder is depleted, causing malfunction of the braking operation. If the pressure control is not appropriately performed, a brake pedal is down for the purpose of safety.

SUMMARY OF THE INVENTION

Accordingly, it is an aspect of the present invention to provide an electronic hydraulic pressure control system and a control method thereof, which can detect an error in differential pressure between a master cylinder and a wheel cylinder.

Additional aspects and/or advantages of the invention will be set forth in part in the description which follows and, in part, will be apparent from the description, or may be learned by practice of the invention.

The foregoing and/or other aspects of the present invention are achieved by providing a method for controlling an electronic hydraulic pressure control system, the method comprising acquiring pressure of a master cylinder and pedal pressure according to a stroke distance of a pedal, detecting a time point at which the pressure of the master cylinder and the pedal pressure reach predetermined reference pressure and determining that an error occurs if the time point exceeds a predetermined reference time point.

The control method further comprises creating an equation based on the pressure of the master cylinder and the stroke distance of the pedal and determining the time point by using the equation.

Current is additionally applied to a valve when it is determined that the error occurs.

According to another aspect, there is provided a method for controlling an electronic hydraulic pressure control system, the method comprising acquiring present data about pressure of a master cylinder and a stroke distance of a pedal, and comparing the present data with previous data and determining that an error occurs if variation in the stroke distance of the pedal according to variation in the pressure of the master cylinder exceeds a predetermined reference value.

Current is additionally applied to a valve when it is determined that the error occurs.

According to still another aspect, there is provided an electronic hydraulic pressure control system comprising a pedal stroke sensor for measuring a stroke distance of a pedal, a master pressure sensor for measuring pressure of a master cylinder, and a controller that detects a time point, at which the pressure of the master cylinder and pedal pressure according to the stroke distance of the pedal reach predetermined reference pressure, and determines that an error occurs when the time point exceeds a predetermined reference time point.

The controller compares present data, which are obtained from the pressure of the master cylinder and the stroke distance of the pedal, with previous data and determines that the error occurs if variation in the stroke distance of the pedal according to variation in the pressure of the master cylinder exceeds a predetermined reference value.

According to the electronic hydraulic pressure control system and a control method thereof, the stable braking operation can be achieved even if the pressure control is not normally performed when controlling the differential pressure.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
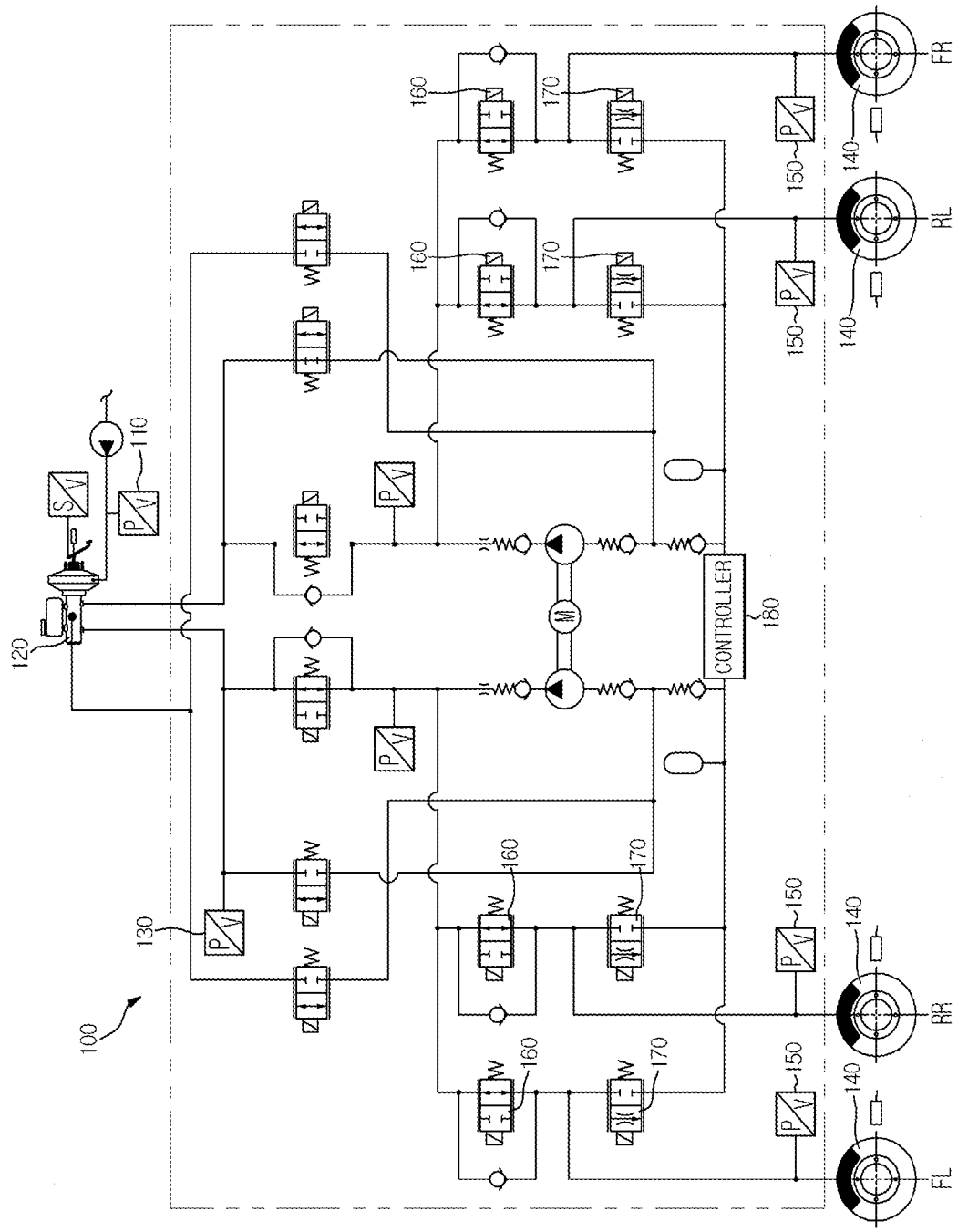
FIG. 1 is a hydraulic circuit view of an electronic hydraulic pressure control system.

Reference will now be made in detail to the embodiments of the present invention, examples of which are illustrated in the accompanying drawings, wherein like reference numerals refer to the like elements. The embodiments are described below to explain the present invention by referring to the figures.

As shown in FIG. 1, an electronic hydraulic pressure control system 100 according to an embodiment of the present invention includes a pedal stroke sensor 110 for measuring a stroke distance of a pedal, a master pressure sensor 130 for measuring pressure of a master cylinder 120, a wheel pressure sensor 150 for measuring pressure of a wheel cylinder 140, a plurality of inlet and outlet valves 160 and 170, and a controller 180 for controlling on/off operation of the inlet and outlet valves 160 and 170.

The operation of the hydraulic system is generally known in the art, so detailed description thereof will be omitted and the following description will be focused on the features of the present invention.

The pedal stroke sensor 110 measures the stroke distance of a brake pedal when a driver steps on the brake pedal. At this time, the pedal stroke sensor 10 measures the stroke distance in a unit of a millimeter (mm).

Hydraulic brake pressure is generated in the master cylinder 120 when the driver steps on the brake pedal, and the master pressure sensor 130 measures the hydraulic brake pressure of the master cylinder 120.

The hydraulic brake pressure of the master cylinder 120 is transferred to the wheel cylinder 140 through on/off operation of the inlet and outlet valves 160 and 170, and the wheel pressure sensor 150 measures the hydraulic brake pressure.

Preferably, normal open solenoid valves are generally used for the inlet valves 160, normal close solenoid valves are generally used for the outlet valves 170, and the controller 180 controls the on/off operation of the valves.

Figure 2:
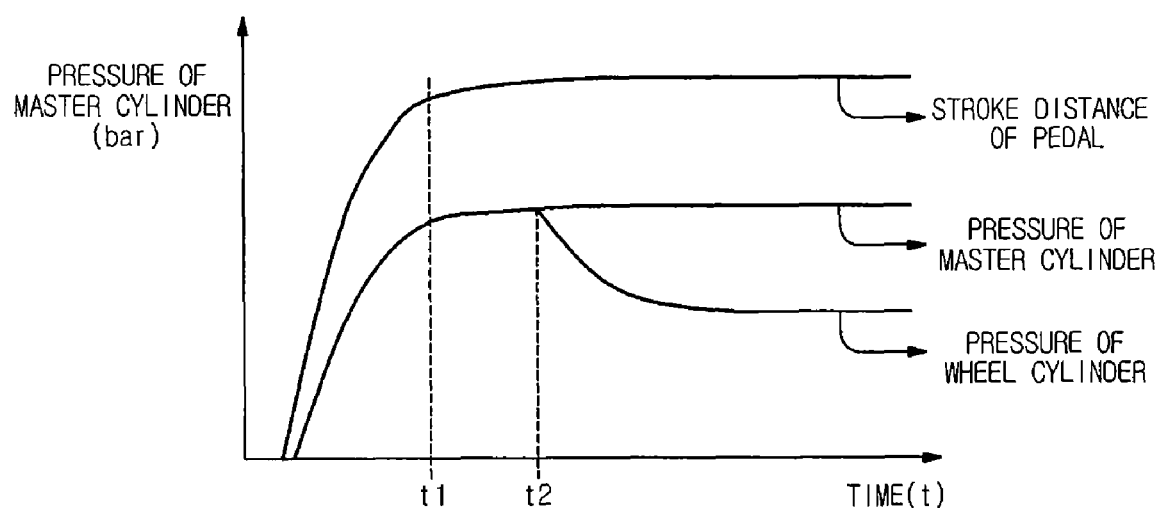
FIG. 2 is a graph showing a stroke distance of a pedal, pressure of a master cylinder, and pressure of a wheel cylinder according to time in a normal state.

FIG. 2 is a graph showing a stroke distance of a pedal, pressure of the master cylinder, and pressure of the wheel cylinder according to time in a normal state.

Referring to FIG. 2, in the normal state, pressure according to the stroke distance of the pedal is constantly maintained after a first predetermined time (t1) has lapsed. Thus, pressure of the master cylinder is also constantly maintained after the first predetermined time (t1) has lapsed.

After that, if a second predetermined time (t2) has lapsed, differential pressure is generated between the master cylinder and the wheel cylinder, and the controller controls the on/off operation of the valves to constantly maintain the differential pressure.

Figure 3:
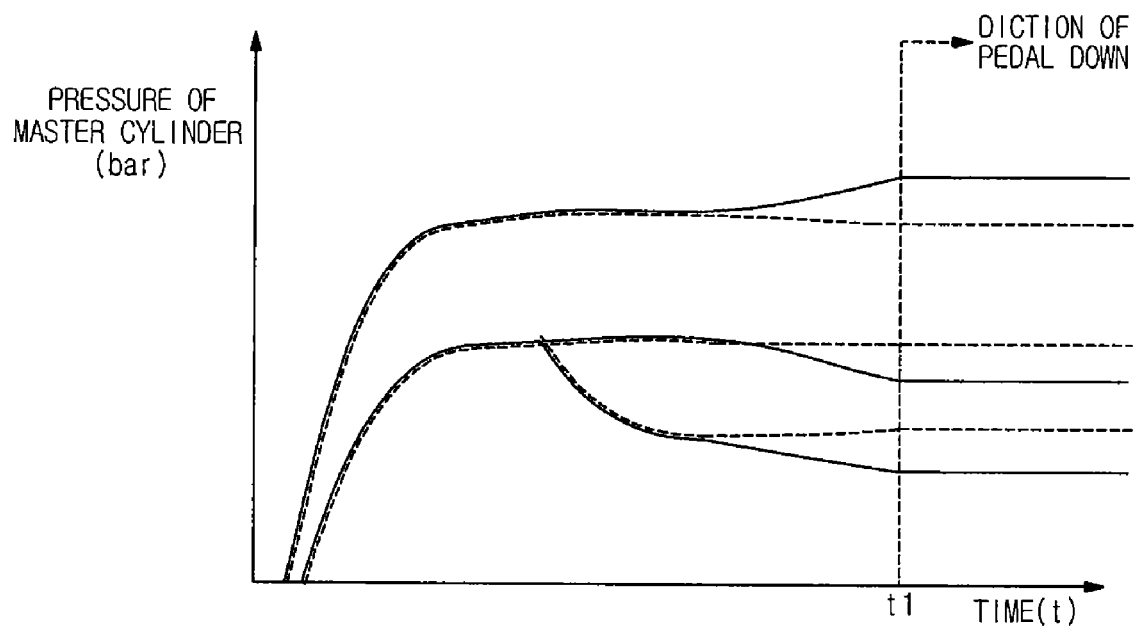
FIG. 3 is a graph showing a stroke distance of a pedal, pressure of a master cylinder, and pressure of a wheel cylinder according to time when an error occurs.

FIG. 3 is a graph showing the stroke distance of the pedal, pressure of the master cylinder, and pressure of the wheel cylinder according to time when an error occurs. Referring to FIG. 3, if the differential pressure control is not properly performed due to variation in peripheral environment and long-time use of the system, pressure of the wheel cylinder is reduced, so that pressure of the master cylinder is also reduced in order to constantly maintain the differential pressure between the wheel cylinder and the master cylinder.

If the pressure of the master cylinder is reduced, the flow rate of the hydraulic liquid is also reduced. Thus, the stroke distance of the pedal is increased, so that pressure of the pedal is increased. In this case, the brake pedal is down when the first predetermined time (t1) has lapsed for the purpose of safety. In order to prevent the above problem, the master pressure sensor 130 measures the pressure of the master cylinder 120 and the pedal stroke sensor 110 measures the stroke distance of the pedal, thereby obtaining pedal pressure according to the stroke distance of the pedal.

The controller 180 detects a time point at which the pressure measured in the master cylinder and the pedal pressure reach reference pressure. If the time point exceeds a predetermined reference time point, the controller 180 determines that an error occurs.

For instance, if the pressure measured in the master cylinder is 100 bar, the pedal pressure is 150 bar, and the time point exceeds 20 seconds when the reference pressure of the master cylinder is set to 100 bar, the reference pressure of the pedal is set to 150 bar, and the reference time point is set to 20 seconds, the controller 180 determines that the abnormal operation is generated, that is, the error occurs.

Figure 4:
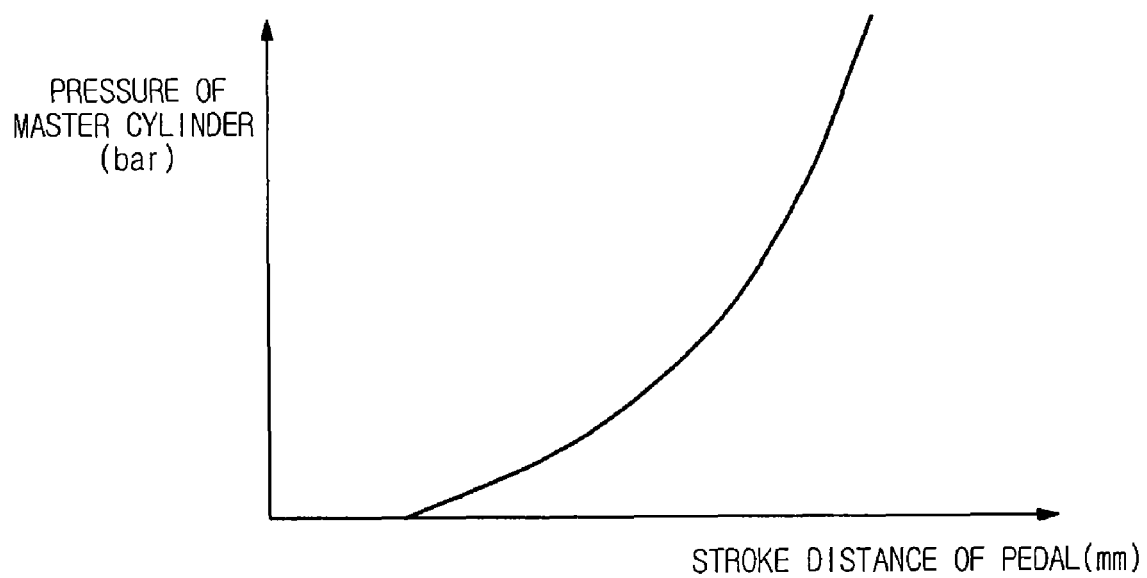
FIG. 4 is a graph showing pressure of a master cylinder according to a stroke distance of a pedal.

In more detail, as shown in FIG. 4, the controller 180 creates an equation based on the pressure of the master cylinder and the stroke distance of the pedal, and detects the time point, at which the pressure measured in the master cylinder and pedal pressure reach the reference pressure, by using the equation. That is, the controller 180 determines the error by comparing and analyzing actual data using the equation, which is created based on the pressure of the master cylinder and the stroke distance of the pedal.

If the controller 180 determines that the error occurs, the controller 180 additionally applies current to the valves. As described above, if the error is detected when controlling the differential pressure, it means that energy of the valves is insufficient, so the controller 180 additionally applies current to the valves.

The predetermined current can be variously preset by the user according to the structure and type of the electronic hydraulic pressure control system and the type and capacity of the valves.

Meanwhile, the master pressure sensor 120 measures the pressure of the master cylinder and the pedal stroke sensor 110 measures the stroke distance of the pedal. At this time, the controller 180 compares present data for the pressure of the master cylinder and the stroke distance of the pedal with previous data. The controller 180 determines that the error occurs, if variation in the stroke distance of the pedal according to variation in the pressure of the master cylinder exceeds a predetermined reference value.

In more detail, the controller 180 acquires data for the pressure of the master cylinder and the stroke distance of the pedal in a predetermined time interval, and compares the present data with the previous data. In addition, if variation in the stroke distance of the pedal according to variation in the pressure of the master cylinder exceeds the predetermined reference value, the controller 180 determines that the error occurs, so that the controller 180 performs the next process.

If the error occurs, the controller 180 additionally applies predetermined current to the valves.

Hereinafter, the control procedure of the electronic hydraulic pressure control system according to the present invention will be described.

Figure 5:
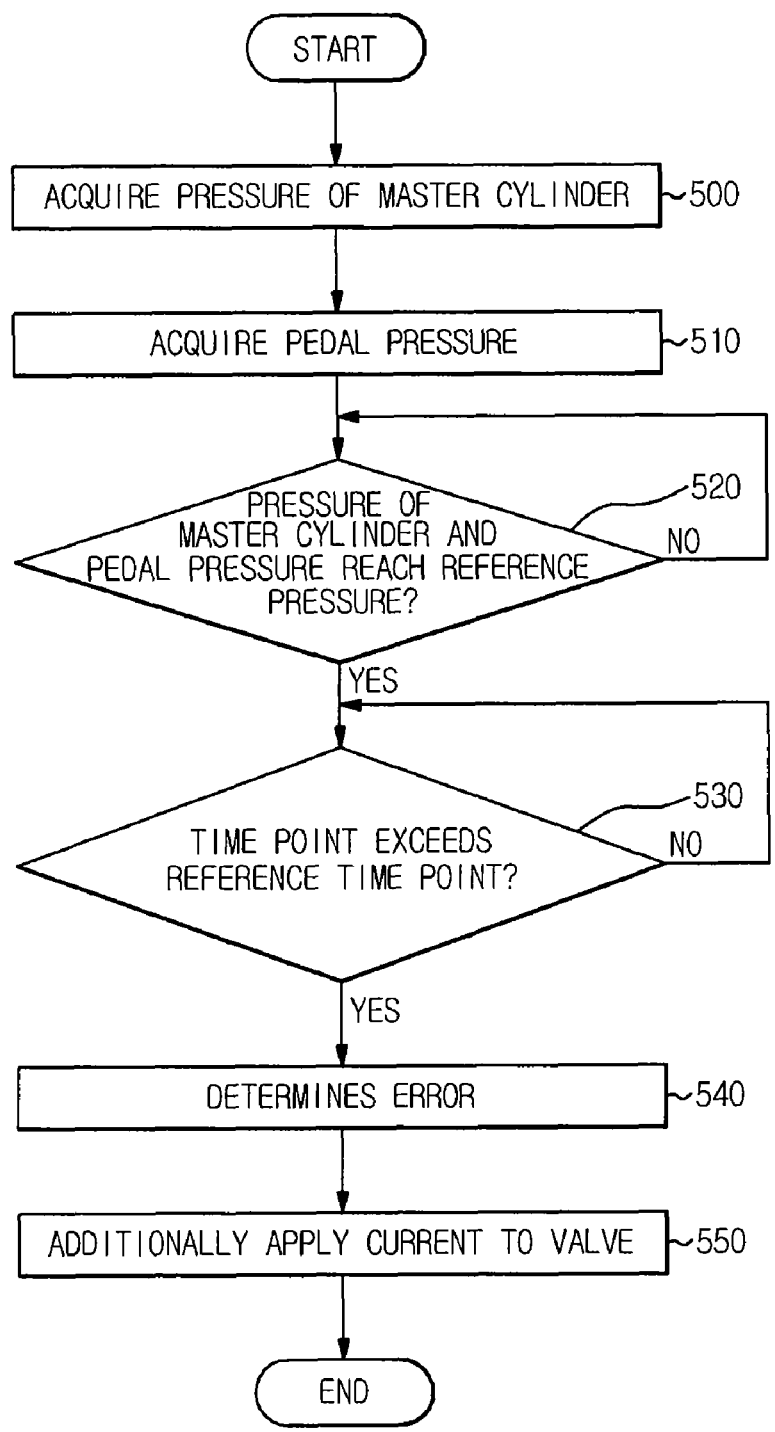
FIG. 5 is a flowchart showing a control procedure of an electronic hydraulic pressure control system according to an embodiment of the present invention.

FIG. 5 is a flowchart showing the control procedure of the electronic hydraulic pressure control system according to an embodiment of the present invention. As shown in FIG. 5, the controller acquires the pressure of the master cylinder (500).

Then, the stroke distance of the pedal is measured to obtain pedal pressure according to the stroke distance of the pedal (510).

Next, it is determined whether the pressure of the master cylinder and the pedal pressure reach the predetermined reference pressure (520). If the pressure of the master cylinder and the pedal pressure reach the predetermined reference pressure, it is determined whether the time point, at which the pressure of the master cylinder and the pedal pressure reach the predetermined reference pressure, exceeds the predetermined reference time point (530).

If the time point exceeds the predetermined reference time point, the controller determines that the error occurs (540), so that the controller additionally applies the current to the valves (550).

Figure 6:
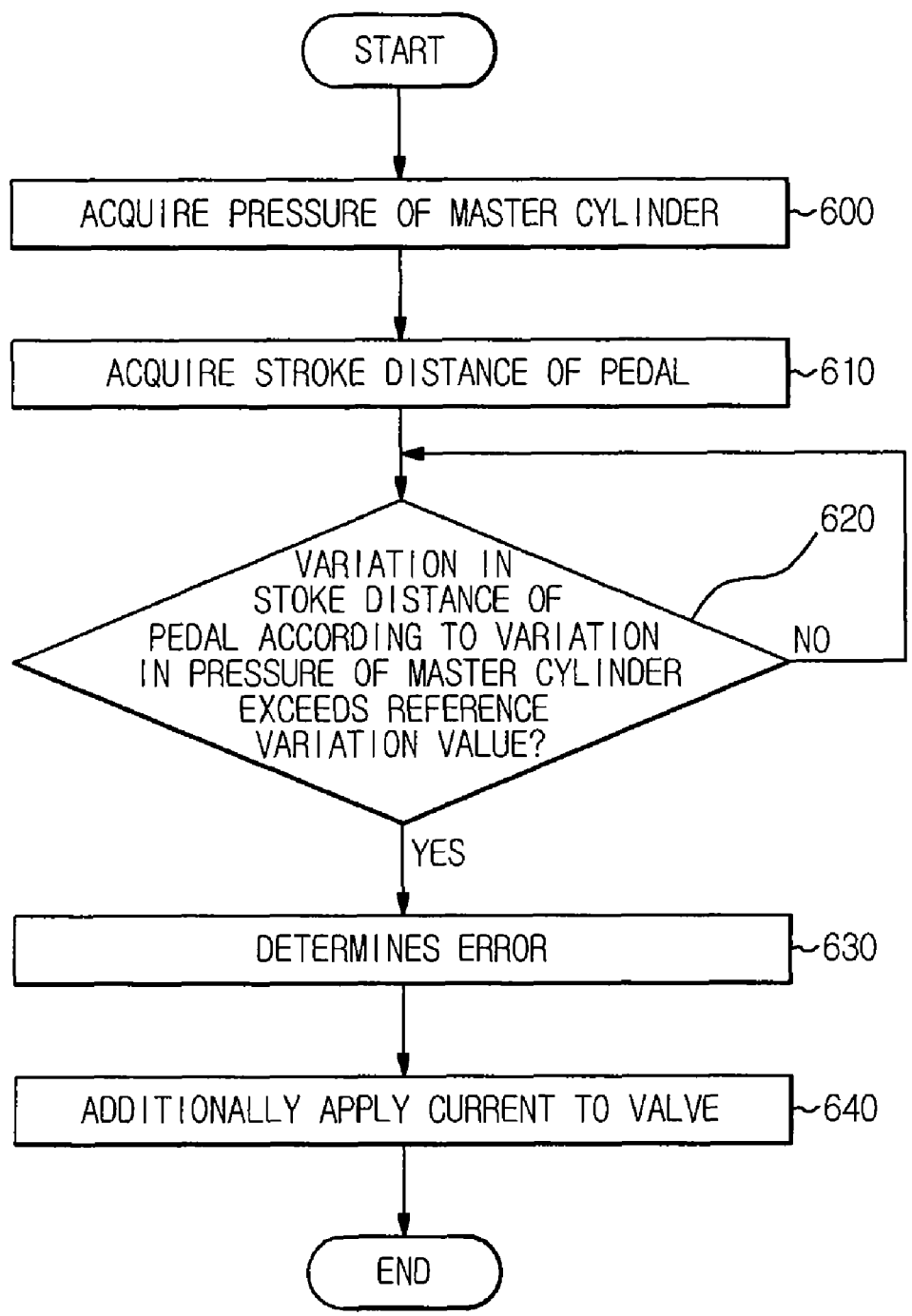
FIG. 6 is a flowchart showing a control procedure of an electronic hydraulic pressure control system according to another embodiment of the present invention.

FIG. 6 is a flowchart showing a control procedure of the electronic hydraulic pressure control system according to another embodiment of the present invention. As shown in FIG. 6, the controller acquires the pressure of the master cylinder (600).

Then, the controller acquires the stroke distance of the pedal (610).

Next, the controller compares the present data for the pressure of the master cylinder and the stroke distance of the pedal with the previous data and determines whether variation in the stroke distance of the pedal according to variation in the pressure of the master cylinder exceeds the reference value (620).

If the variation in the stroke distance of the pedal according to the variation in the pressure of the master cylinder exceeds the reference value, the controller determines that the error occurs (630), so the controller additionally applies the current to the valves (640).

Such an error signifies that energy of the valves is insufficient for controlling the differential pressure, so the controller additionally applies the current to the valves.

Although few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method for controlling an electronic hydraulic pressure control system, the method comprising:
   acquiring a pressure of a master cylinder and a pedal pressure according to a stroke distance of a pedal;
   detecting a time point at which the pressure of the master cylinder and the pedal pressure reach a predetermined reference pressure;
   determining that an error occurs if the time point exceeds a predetermined reference time point,
   comparing present data, which are obtained from the pressure of the master cylinder and the stroke distance of the pedal, with previous data; and
   determining that the error occurs if a variation in the stroke distance of the pedal according to variation in the pressure of the master cylinder exceeds a predetermined reference value.

2. The method as claimed in claim 1, further comprising:
   creating an equation based on the pressure of the master cylinder and the stroke distance of the pedal; and
   determining the time point by using the equation.

3. The method as claimed in claim 1, wherein current is additionally applied to a valve when it is determined that the error occurs.

4. A method for controlling an electronic hydraulic pressure control system, the method comprising:
   acquiring previous data relating a pressure of a master cylinder to a stroke distance of a pedal;
   acquiring present data relating the pressure of the master cylinder to the stroke distance of the pedal; and
   comparing the present data with the previous data and determining that an error occurs if a variation between the present data and the previous data relating the pressure of the master cylinder to the stroke distance of the pedal exceeds a predetermined reference value.

5. The method as claimed in claim 4, wherein current is additionally applied to a valve when it is determined that the error occurs.

6. An electronic hydraulic pressure control system comprising:
   a pedal stroke sensor for measuring a stroke distance of a pedal;
   a master pressure sensor for measuring a pressure of a master cylinder; and
   a controller that detects a time point, at which the pressure of the master cylinder and a pedal pressure according to the stroke distance of the pedal reach a predetermined reference pressure, and determines that an error occurs when the time point exceeds a predetermined reference time point,
   wherein the controller compares present data, which are obtained from the pressure of the master cylinder and the stroke distance of the pedal, with previous data and determines that the error occurs if a variation in the stroke distance of the pedal according to variation in the pressure of the master cylinder exceeds a predetermined reference value.

7. The electronic hydraulic pressure control system as claimed in claim 6, wherein the controller is further configured to:
   create an equation based on the pressure of the master cylinder and the stroke distance of the pedal; and
   determine the time point by using the equation.

8. A method for controlling an electronic hydraulic pressure control system, the method comprising:
   acquiring a pressure of a master cylinder and a pedal pressure according to a stroke distance of a pedal;
   detecting a time point at which the pressure of the master cylinder and the pedal pressure reach a predetermined reference pressure;
   determining that an error occurs if the time point exceeds a predetermined reference time point;
   creating an equation based on the pressure of the master cylinder and the stroke distance of the pedal;
   determining the time point by using the equation;
   comparing present data, which are obtained from the pressure of the master cylinder and the stroke distance of the pedal, with previous data; and
   determining that the error occurs if a variation in the stroke distance of the pedal according to variation in the pressure of the master cylinder exceeds a predetermined reference value.

\* \* \* \* \*